United States Patent
Opavsky et al.

(10) Patent No.: US 8,169,894 B2
(45) Date of Patent: May 1, 2012

(54) FAULT-TOLERANT COMMUNICATIONS IN ROUTED NETWORKS

(75) Inventors: Rudolf Opavsky, Redmond, WA (US); David Allen Dion, Bothell, WA (US); Michael T. Massa, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/884,096

(22) Filed: Sep. 16, 2010

(65) Prior Publication Data

US 2011/0004782 A1 Jan. 6, 2011

Related U.S. Application Data

(63) Continuation of application No. 11/275,185, filed on Dec. 16, 2005, now Pat. No. 7,821,930.

(60) Provisional application No. 60/716,122, filed on Sep. 12, 2005.

(51) Int. Cl.
*H04Q 11/04* (2006.01)

(52) U.S. Cl. ........................................ 370/217; 370/248

(58) Field of Classification Search .................. 370/216, 370/218, 235, 248; 395/182.2; 714/4; 709/239
See application file for complete search history.

(56) References Cited

U.S. PATENT DOCUMENTS

| | | | | |
|---|---|---|---|---|
| 5,774,640 | A * | 6/1998 | Kurio | 714/4.3 |
| 6,272,113 | B1 * | 8/2001 | McIntyre et al. | 370/248 |
| 6,314,525 | B1 * | 11/2001 | Mahalingham et al. | 714/4.12 |
| 6,392,990 | B1 * | 5/2002 | Tosey et al. | 370/218 |
| 6,567,377 | B1 | 5/2003 | Vepa | |
| 6,609,213 | B1 | 8/2003 | Nguyen | |
| 6,665,812 | B1 | 12/2003 | Blumenau | |
| 7,191,235 | B1 | 3/2007 | O'Rourke | |
| 7,386,610 | B1 | 6/2008 | Vekiarides | |
| 7,821,930 | B2 | 10/2010 | Massa | |
| 7,861,002 | B2 * | 12/2010 | Puon et al. | 709/239 |
| 2004/0008717 | A1 | 1/2004 | Verma et al. | |
| 2004/0062195 | A1 | 4/2004 | Mishra et al. | |
| 2004/0078625 | A1 | 4/2004 | Rampuria et al. | |
| 2004/0214576 | A1 | 10/2004 | Myers | |

(Continued)

FOREIGN PATENT DOCUMENTS

| | | |
|---|---|---|
| JP | 11-355322 | 12/1999 |
| JP | 2003-333080 | 11/2003 |

OTHER PUBLICATIONS

"International Search Report"; Korean Intellectual Property Office; Feb. 27, 2007.

(Continued)

*Primary Examiner* — Kwang B Yao
*Assistant Examiner* — Syed M Bokhari
(74) *Attorney, Agent, or Firm* — L. Alan Collins; Collins & Collins Intellectual, LLC

(57) ABSTRACT

A method for providing fault-tolerant network communications between a plurality of nodes for an application, including providing a plurality of initial communications pathways over a plurality of networks coupled between the plurality of nodes, receiving a data packet on a sending node from the application, the sending node being one of the plurality of nodes, the data packet being addressed by the application to an address on one of the plurality of nodes, and selecting a first selected pathway for the data packet from among the plurality of initial communications pathways where the first selected pathway is a preferred pathway.

20 Claims, 11 Drawing Sheets

U.S. PATENT DOCUMENTS

| | | | |
|---|---|---|---|
| 2005/0100027 A1 | 5/2005 | Leinwand | |
| 2005/0193127 A1 | 9/2005 | Moore | |
| 2005/0281190 A1* | 12/2005 | McGee et al. | 370/216 |
| 2005/0281191 A1* | 12/2005 | McGee et al. | 370/216 |
| 2007/0025253 A1* | 2/2007 | Enstone et al. | 370/235 |
| 2007/0058525 A1 | 3/2007 | Arrowood | |

OTHER PUBLICATIONS

U.S. Appl. No. 12/884,101, filed Sep. 16, 2010, Massa.

JP Application No. 2008-531252 (Translation), Notice of Rejection, mailed Mar. 1, 2001.

* cited by examiner

FAULT-TOLERANT COMMUNICATIONS IN ROUTED NETWORKS

CROSS-REFERENCE TO RELATED APPLICATIONS

This application is a continuation of U.S. patent application Ser. No. 11/275,185, filed on Dec. 16, 2005, that claims priority from U.S. Provisional Patent Application No. 60/716,122, filed on Sep. 12, 2005.

BACKGROUND

In a computer networking environment, multiple nodes may communicate with each other over a network. Should the network experience a failure, communication between the nodes may be disrupted.

SUMMARY

The following presents a simplified summary of the disclosure in order to provide a basic understanding to the reader. This summary is not an extensive overview of the disclosure and it does not identify key or critical elements of the invention or delineate the scope of the invention. Its sole purpose is to present some concepts disclosed herein in a simplified form as a prelude to the more detailed description that is presented later.

The following examples provide computer network communication fault-tolerance via unique network stack architectures requiring minimal consideration by application software operating on networked nodes.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

Although the present examples are described and illustrated herein as being implemented in a computing and networking system, the system described is provided as an example and not a limitation. As those skilled in the art will appreciate, the present examples are suitable for application in a variety of different types of computing and networking systems.

Figure 1:
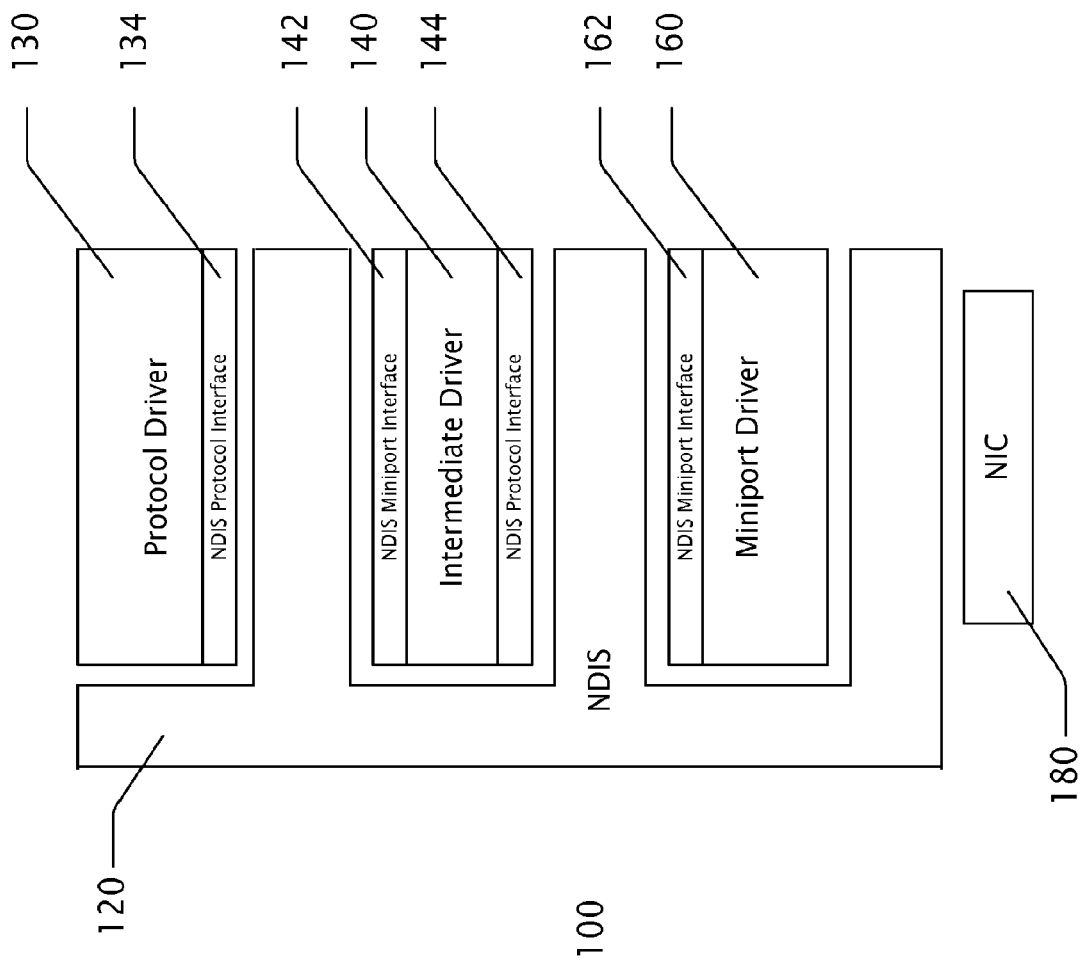
FIG. 1 is block diagram showing an example network stack architecture.

FIG. 1 is block diagram showing an example network stack architecture 100. A network stack ("stack") generally couples with software applications via network stack interfaces and/or other interfaces to provide network communications functionality to applications. An application is typically said to be at (or coupled to) the "top" of the stack. A network is typically said to be at (or coupled to) the "bottom" of the stack. Various elements of a network stack may be referred to as at or near the top or bottom of the stack, or higher or lower in the stack relative to each other. For example, in FIG. 1, protocol driver 130 is higher in the stack than NIC 180 which is shown at the bottom of the stack in this particular figure. Various depictions of a network stack may or may not include some stack elements, or may group, order or name the elements in various ways, depending on the purpose or focus of the depiction, as understood by those skilled in the art.

The term "driver" as used herein refers to a control program or the like that enables a node to operate with a particular device, such as a printer, network interface card, or other computer subsystem, or to operate with one or more programs such as network stacks, protocol drivers, and/or other computer software or firmware or the like. For example, a protocol driver typically operates with a network stack.

An application may pass a packet of data to a stack destined for an application operating on another node. In this case, the data is said to flow "down" the stack and is sent out over a network. Data received by a node is said to flow "up" the stack until it reaches the destined application. Such networking systems are well known to those skilled in the art.

In one example a stack is based on the Network Driver Interface Specification ("NDIS") which defines a standard application programming interface ("API") for network interface cards ("NICs"), such as NIC 180, and abstracts the network hardware from network drivers. NDIS also specifies a standard interface between layered network drivers, thereby abstracting lower-level drivers that manage hardware, such as a miniport driver, from upper-level drivers, such as protocol drivers. Multiple NDIS-conforming protocol drivers may coexist on a single node. Also, if a node includes multiple NICs, perhaps because it is connected to more than one network, NDIS routes network traffic to the appropriate NIC via its associated driver as indicated by the traffic. An illustration of a NDIS is shown in FIG. 1. Other networking stack standards, technologies and/or architectures, such as the Open Data-Link Interface ("ODI"), the Data Link Provider Interface ("DLPI"), the Uniform Driver Interface ("UDI"), or other technologies, may be used with the following examples as well with appropriate modifications, as would be understood by those skilled in the art. As a matter of convenience, NDIS and NDIS terminology is used with examples throughout this description, but other standards, technologies and/or architectures may be used in all of these examples with appropriate modifications, unless otherwise noted.

As shown in FIG. 1, coupled to NIC 180 via NDIS 120 is miniport driver 160. A miniport driver typically interacts with NDIS via an NDIS miniport interface 162. The miniport driver 160 may be associated with NIC 180 and may manage its operations, including sending and receiving data through the NIC. The miniport driver 160 typically interfaces with higher-level drivers, such as intermediate driver 140 and protocol driver 130. A miniport driver is considered a NIC driver. NIC miniports generally perform those hardware-specific operations needed to manage a particular NIC with common or NIC-independent functionality provided by NDIS. A node may include multiple NICs with each NIC generally having an associated NIC driver. Some examples in this description describe the use of miniport drivers but, as will be understood by those skilled in the art, any type of NIC driver or the like may be used in these examples, unless otherwise noted.

Protocol or transport driver 130 couples to NDIS 120 via an NDIS protocol interface 134. Protocol drivers or transport protocol drivers generally provide the functionality to create, send and receive packets of data that are sent from one node to another through the network stack and over a network. As known to those skilled in the art, a common reliable or guaranteed delivery transport protocol may be TCP/IP (Transmission Control Protocol/Internet Protocol). UDP (User Datagram Protocol) over IP may be a common unreliable or non-guaranteed delivery protocol. TCP, UDP and/or other protocols, such as IPX/SPX (Internet Packet Exchange/Sequenced Packet Exchange), may be used with the following examples unless otherwise noted.

NDIS intermediate ("IM") drivers 140 are shown between protocol drivers 130 and NDIS NIC miniports 160 in FIG. 1. To protocol drivers IM drivers appear to be NDIS miniports while to NIC drivers they look like protocol drivers. Data packets flowing up or down the network stack pass through the IM driver 140 which may ignore, inspect, filter, forward, redirect and/or modify the data packets. An intermediate driver 140 may also be known as a filter driver.

Figure 2:
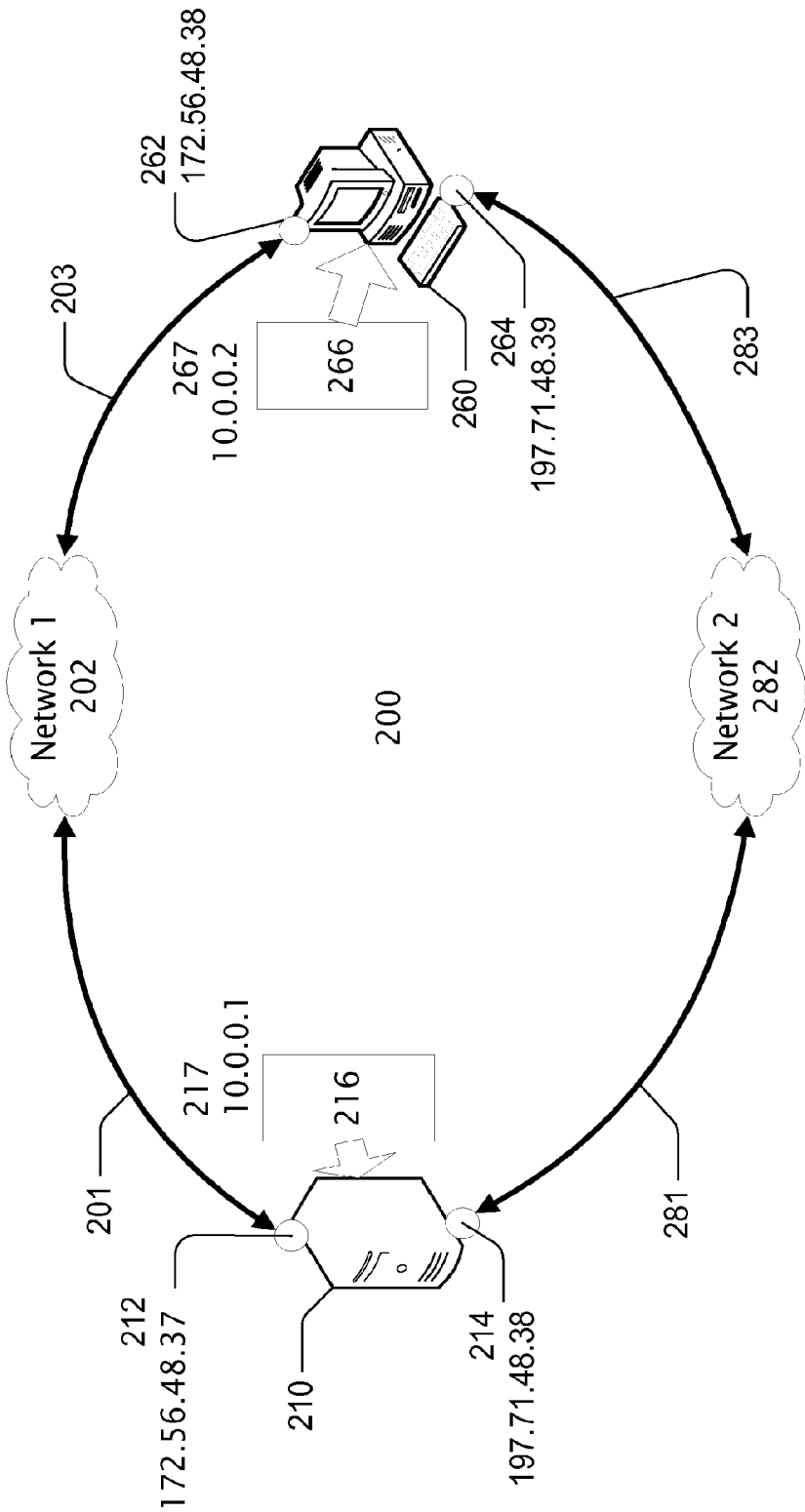
FIG. 2 is a block diagram showing a networked computing environment including two example nodes coupled via two networks.

FIG. 2 is a block diagram showing a networked computing environment 200 including two example nodes 210 and 260 coupled via two networks 202 and 282. Nodes 210 and 260 may each be personal computers ("PCs"), client computers, servers, hosts, laptops, portable devices, consumer electronic devices, or any of various other types of computing or processing devices, machines or systems. One non-limiting example of a type of computing system is described in detail below with respect to FIG. 11. Circles 212, 214, 262, and 264 represent NICs associated with their respective nodes. One non-limiting example of a type of NIC is further described below with respect to FIG. 11 as network adapter 1113.

As used herein, the term node refers to any computing system, device, or process that is uniquely addressable, or otherwise uniquely identifiable, in a network (e.g., network 202) and that is operable to communicate with other nodes in the network. For example, and without limitation, a node may be a personal computer, a server computer, a hand-held or laptop device, a tablet device, a multiprocessor system, a microprocessor-based system, a set top box, a consumer electronic device, a network PC, a minicomputer, a mainframe computer, or the like. A non-limiting example of a node 210, in the form of a computing system, is set forth below with respect to FIG. 11.

Networks 202 and 282 may be the same network, may exist on the same or different subnets, may be logically or physically coupled or isolated from each other, may use similar or different networking technologies, etc. In particular, networks 202 and 282 may be routed networks, that is, networks including routers that forward routable protocol packets. Routable protocols are typically considered communications protocols used to route data from one network to another. An example of a routable protocol is TCP/IP. Sending a data packet in a routable fashion implies using a routable transport protocol to format and/or send the data packet. Those skilled in the art will be familiar with routable protocols and routing network topologies, systems and architectures.

In one example, networks 202 and 282 may be independent of each other such that if there is a problem or failure with one network it is unlikely to affect the operational status of the other. In other examples, three or more networks may be used. In examples where greater degrees of fault-tolerance are desired a larger number of networks along with the associated connectivity of nodes to those networks, including a similar number of NICs installed on a node, may be employed.

NIC 212, associated with node 210, is shown with an example address of 172.56.48.37 and is coupled to network 1 202. NIC 214, also associated with node 210, is shown with an example address of 197.71.48.38 and is coupled to network 2 282. NIC 262, associated with node 260, is shown with an example address of 172.56.48.38 and is also coupled to network 1 202. NIC 264, also associated with node 260, is shown with an example address of 197.71.48.39 and is also coupled to network 2 282. These addresses may, in practice, be IPv4 or IPv6 addresses or the like, or any other type of network address typically related to the protocol being used.

Each node may include one or more NICs. Arrows 201 and 203, also shown in FIG. 11 as arrow 1114, represent a first communications route or pathway ("Path A") over network 1 202 between nodes 210 and 260. Arrows 281 and 283 represent a second communications route or pathway ("Path B") over network 2 282 between nodes 210 and 260. In practice, there may be one or more pathways over one or more networks between the two or more nodes in environment 200. The term "pathway" as used herein is defined as a communications route, or communications link, between nodes in a network. Such a route or link may be dynamic in that the exact route between nodes may change over time.

Blocks 216 and 266 represent an application and a network stack, including a fault-tolerant communications ("FT") driver, provided on each of nodes 210 and 260. The FT driver of block 216 is shown with an example address of 10.0.0.1 and the FT driver of block 266 is shown with an example address of 10.0.0.2. These addresses are typically considered virtual addresses. These addresses may be IPv4 or IPv6 addresses or the like, or any other type of network or communications address. FT drivers may or may not have virtual addresses as shown in the various examples below.

A fault-tolerant network stack is a network stack including an FT driver, such as NETFT described below in connection with FIG. 3, or the like. An FT driver, such as NETFT, operating in combination with a network stack typically allows nodes to communicate with each other via one or more communications paths, such as Path A and Path B, over one or more networks. Should any of these communications paths fail, the nodes may continue communicating given at least one operational pathway. Such a pathway failure may result from failure of a NIC or failure of any element of a pathway, including connections, cabling or other communications media (including radio frequency ("RE") or infrared ("IR") and the like), routers, hubs, switches, firewalls, Internet Service Providers ("ISPs"), power failure to any node, device or system of the network, or the like.

In one example, a communications failure may result in a plug-and-play ("PnP") event. A PnP event may indicate the removal of a NIC from its node or to a media sense change. A media sense disconnect, for example, typically results from a failure that causes the NIC to lose the signal or carrier on the network media, such as a network cable, RF or IR link or the like. A media sense disconnect may be caused by disconnecting the network cable or carrier from the NIC or powering off the other end of the cable (a hub or switch, for example). A media sense connect is typically the opposite, such as reconnecting the cable, re-powering on the hub or switch or the like. These types of events, also known as connectivity events, are generally local events in that they occur on or are proximate to the node itself. Such local connectivity events typically result in an event indication, such as a PnP event or the like, on a node.

In another example, a communications failure may be detected by using heartbeat packets sent between nodes. Failure of such a heartbeat packet may indicate failure of a pathway between nodes. Heartbeat packets tend to be marked such that the FT driver can detect them upon receipt and remove them for the packet flow being passed up the network stack. In one example, heartbeat packets may be implemented using route control protocol ("RCP") by forming RCP packets. Such heartbeat packets may be used to validate the end-to-end operational status of a pathway. That is, by sending a heartbeat packet from node 210 over Path A to node 260 and by node 210 receiving a reply to the sent heartbeat packet from node 260, it is generally considered that Path A is end-to-end operational. Should the heartbeat fail (no heartbeat reply received in response to the heartbeat sent), such a failure may indicate that Path A is not operational, perhaps due to failure of some element of network 1 202 such as a router, switch, connection, or the like, or due to the target node itself failing. In particular, node 210 may have an operational NIC 212 and valid media sense, indicating that it is properly connected to the network, but may still detect a heartbeat failure due to some network or system failure down the line.

Figure 3:
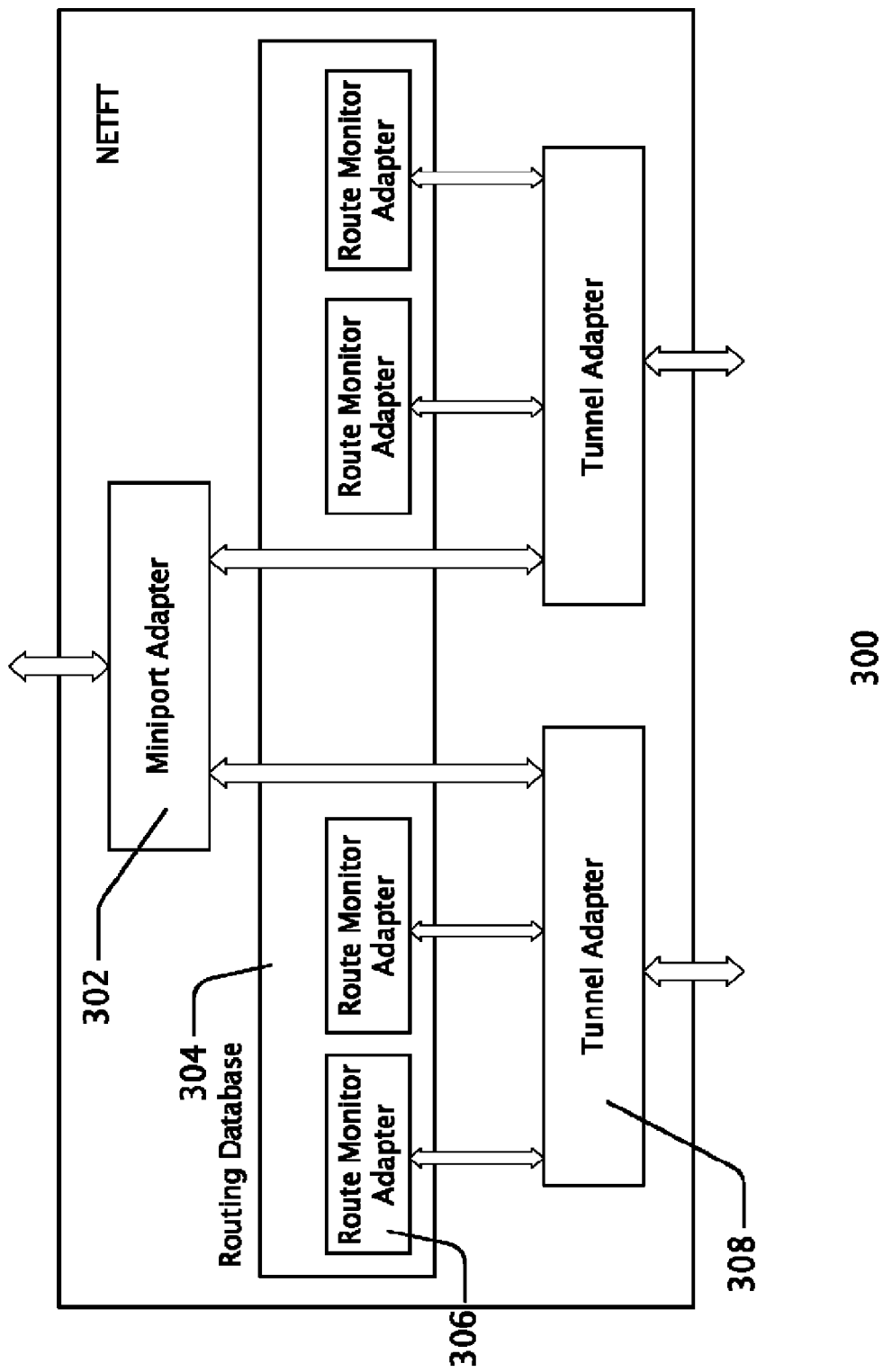
FIG. 3 is a block diagram showing an example fault-tolerant communications driver, NETFT.

FIG. 3 is a block diagram showing an example fault-tolerant communications driver, NETFT 300. NETFT 300 may be implemented as an NDIS miniport driver (FIG. 1, 160) for use with an NDIS network stack and for providing network communications between nodes tolerant of pathway failures. That is, communications between two or more nodes may continue when each is using a NETFT despite failure of any component in the pathway as long as at least one pathway remains operational.

In one example, implementation of the FT driver as an NDIS miniport driver provides at least two benefits. First, because such an FT driver generally sits below any protocol drivers in the stack, protocol reliability tends to be provided by any higher-level reliable protocol driver which is generally unaffected by the addition of link-level fault-tolerance provided by an FT driver. For example, when using an FT driver in combination with a protocol driver such as a TCP/IP driver, the FT driver will typically detect failed pathways and route data packets over end-to-end operational pathways independent of any protocol driver. Should any packet loss occur due to switching pathways, the TCP/IP protocol driver, which generally sits above the FT driver in the stack, tends to detect such losses and perform any retry or resend operations to ensure that the reliable protocol succeeds in packet delivery.

A second benefit of placing the FT driver below the protocol driver in the stack is that typically no degradation of the routability of the protocol is introduced. When so configured, any tunneling operation that an FT driver performs on a data packet may employ a routable protocol, such as TCP or UDP, thus ensuring that such data is routable, in addition to being link-level fault tolerant. To "routeably tunnel" a data packet is to tunnel a data packet using a routable protocol.

NETFT, as a part of a network stack, generally couples to a software application via NDIS or other network stack interfaces. Such a coupling generally enables applications to send and receive data packets over networks coupled to the bottom of the stack. In one example, applications tend to use a virtual address as the source address for their data packets, this virtual address being known to NETFT and mapped and communicated to other nodes on the network as described below. As shown in FIG. 3, NETFT includes a miniport adapter 302 (also known as a processing element) a routing database 304, and one or more route monitor adapters 306 and tunnel adapters 308.

Tunnel adapter 308 typically represents one NIC on the local node (or, in some instances, a virtual NIC) and maintains a socket used to tunnel packets to NETFT on the target node. There is typically one tunnel adapter 308 associated with each NIC on the local node with each NIC being coupled to a network providing a pathway to another node. Each network may or may not be isolated from any other network. A tunnel adapter 308 is typically associated with a tunneling protocol driver and tunnels data packets through a tunneling protocol to and from its associated NIC via NDIS interfaces. One example of a tunneling protocol is UDP. Alternatively, other protocols, such as TCP, IPX, or SPX, may be used for tunneling. A tunnel adapter 308 may become inactive should the associated NIC or media connection become inactive.

A routing database 304, as implemented in NETFT, is typically a simple data structure, that may be located in system memory, that includes entries mapping a virtual address for one or more pathways to a similar NETFT on another node. In one example, mappings are represented by route monitor adapters such as route monitor adapter 306 which are typically associated with a tunnel adapter such as tunnel adapter 308. Generally a routing database such as routing database 304 will include one set of route adapters for each tunnel adapter, each route adapter being associated with a different target node reachable over the pathway associated with the tunnel adapter. When using TCP/IP, for example, the database may map a destination virtual address to a physical address of a specific remote node.

A routing database 304 may also include priority information for each pathway. Such priority information may be used to indicate a preferred or primary pathway to another node and/or may include information about pathway speed or other characteristics. A preferred pathway is the pathway calculated by NETFT to be used over other possible pathways, when possible, based on priority information and/or pathway status. Priority information may alternatively indicate a round-robin load balancing algorithm for making use of multiple pathways to a target node to load-balance traffic over the pathways, or enable some other pathway prioritization scheme.

An example routing table database 304 mapping table is shown in Table 1.

TABLE 1

| Destination Address Type | Address | Priority |
|---|---|---|
| Virtual | 10.0.0.2 | — |
| Physical: Path A | 172.56.48.38 | 1 |
| Physical: Path B | 197.71.48.39 | 2 |

Referring to table 1 and FIG. 2, table 1 shows an example mapping table as might be used by NETFT operating on node 216. Table 1 shows virtual destination address 10.0.0.2, the virtual address as shown for node 266, mapped to physical address 172.56.48.38 associated with Path A to node 266 and physical address 197.71.48.39 associated with Path B to node 266. Path A is shown with first priority and Path B with second priority. Table 1 is provided as an example and is not intended to be limiting.

When sending data from node 216 to node 266, such a mapping table is typically used to tunnel a packet destined to virtual destination address 10.0.0.2 by forwarding the packet via a tunneling protocol, such as UDP, to physical destination address 172.56.48.38, thus tunneling the packet from node 216 over Path A to node 266. One such mapping table may be created in the routing database (FIG. 3, 304) for each set of pathways established between two nodes. Such a mapping table may be implemented in various forms, use various priority schemes and/or store other information including pathway operational status. The mapping table structure, number of pathways, address formats, etc. shown in Table 1 are provided as examples and are not intended to be limiting.

The local node virtual address, remote node virtual addresses, and priority and other pathway information are typically provided to nodes by an out-of-band mechanism and passed to NETFT via its NDIS interfaces. This out-of-band mechanism may be as simple as a systems administrator using a management application to specify the information, or it may be an automated system or the like. Such out-of-band mechanisms are well known to those skilled in the art.

As shown in FIG. 3, miniport adapter 302 (also known as the processing element of the driver) typically parses a data packet flowing down the network stack, examines the destination virtual address of the packet and uses information from the routing database 304 to determine which tunnel adapter 308 to tunnel the data packet through. Incoming packets, or data packets flowing up the stack, are forwarded up the stack toward their destination virtual address, the tunneling protocol having previously removed the tunneling packet headers. In particular, the tunnel adapter 308 inspects incoming packets and forwards heartbeat packets to a route monitor adapter 306 and forwards other packets up the stack via a miniport adapter 302. Aspects of tunneling data packets using a tunneling protocol and how protocol headers are added and removed by protocol drivers is well known to those skilled in the art.

Route monitor adapter 306 typically represents a remote node accessible over a specific pathway identified by an associated tunnel adapter. The route monitor adapter 306 will typically provide a physical address for the remote node, the physical address also corresponding to a specific pathway to the remote node. This physical address is typically used for mappings in a routing database 304. There is typically one route monitor adapter for each distinct pathway to a remote node, each route monitor adapter being associated with a tunnel adapter representing a pathway. In one example, referring back to FIG. 2, node 210 is shown coupled to node 260 over two pathways, one through network 1 202 ("Path A") and the other through network 2 282 ("Path B"). NETFT operating on node 210 may include a first route monitor adapter ("RMA-A") providing remote node 260's physical address 172.56.48.38 associated with its NIC 262. RMA-A may be associated with a first tunnel adapter ("TA-A") on node 210 which may be associated with Path A. NETFT on node 210 may also include a second route monitor adapter ("RMA-B") providing remote node 260's second physical address 197.71.48.39 associated with its NIC 264. RMA-B may be associated with a second tunnel adapter ("TA-B") on node 210 which may be associated with Path B.

Referring to FIG. 3, route monitor adapter 306 typically monitors the health of a pathway to a remote node and indicates a failed or non-operational pathway in the routing database 304. Monitoring typically includes receiving any event indications and/or noting any heartbeat failures and updating the database 304 accordingly. In one example, an event indicating the failure of a NIC or media connection may result in the disabling of the tunnel adapter 308. In another example, a heartbeat failure may result in the disabling of the route monitor adapter 306 associated with the specific remote node for which the heartbeat failed.

Figure 4:
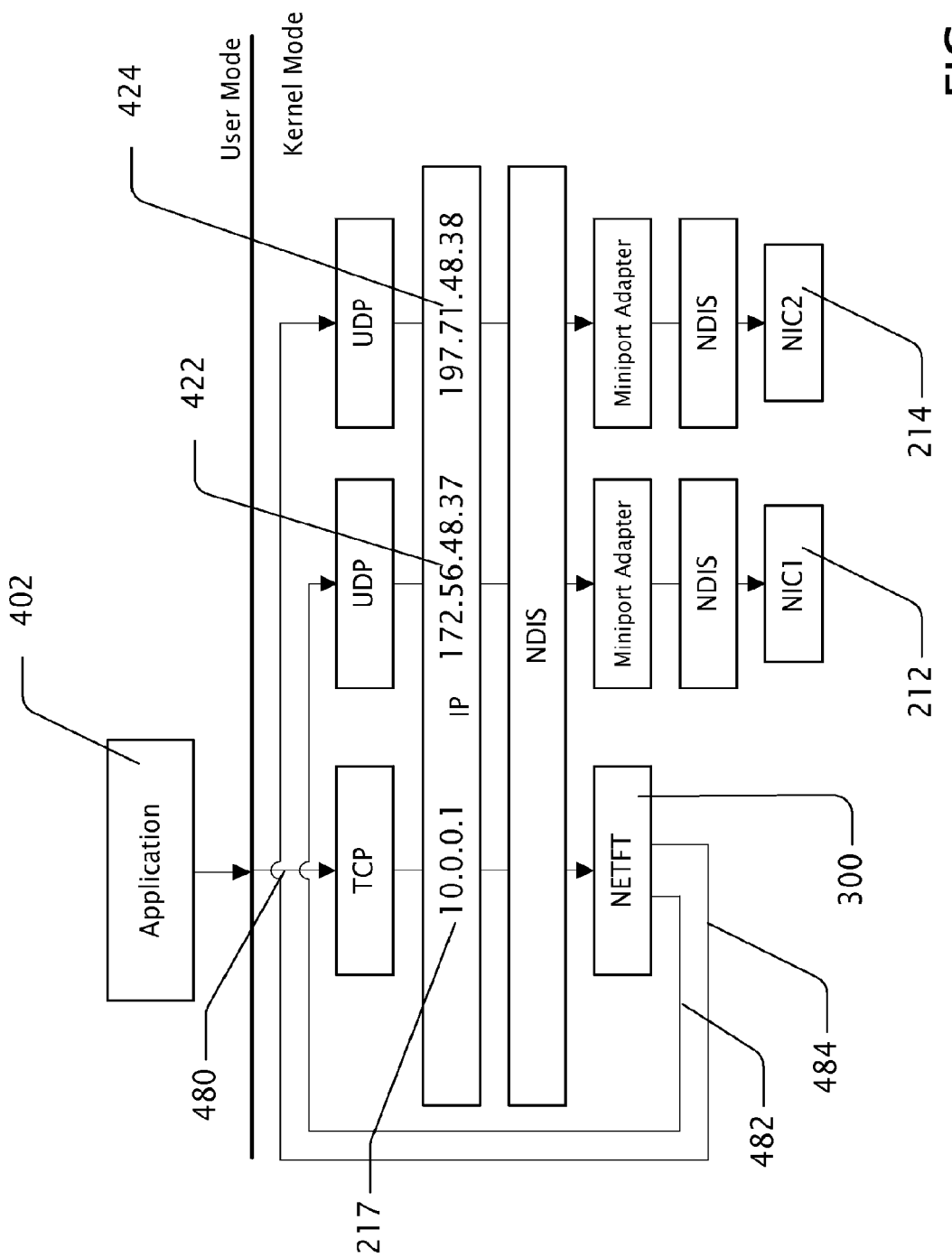
FIG. 4 is a block diagram showing an example fault-tolerant communications architecture including NETFT and an application.

FIG. 4 is a block diagram showing an example fault-tolerant communications architecture 216 including NETFT 300 and an application 402. In this example, the application 402 sends data packets to NETFT 300 via the stack using a virtual source address 217 and a virtual destination address representing the destination node. Such out-going data packets flow via path 480 from the application and through the network stack to the driver 300. The driver 300 typically determines which of the possible pathways each packet should take, generally using priority information and pathway operational status information stored in the routing database, and tunnels the packet to the target node over the selected pathway using the appropriate physical source address 422 or 424.

Application 402 may send a data packet through NETFT 300 via the TCP protocol, as shown in FIG. 4. Alternatively UDP or any other protocol may be used. Also, as shown, NETFT 300 may use the UDP protocol to tunnel packets to the target node. Alternatively, TCP or any other protocol may be used for tunneling. Further, alternate examples may not make use of miniport adapters or NDIS drivers but may use other mechanisms or architectures to perform similar functions. Finally, the various elements of the network stack and the like may operate in either a User Mode or a Kernel Mode, either as shown or otherwise, or on systems with or without equivalent modes of operation.

Figure 5:
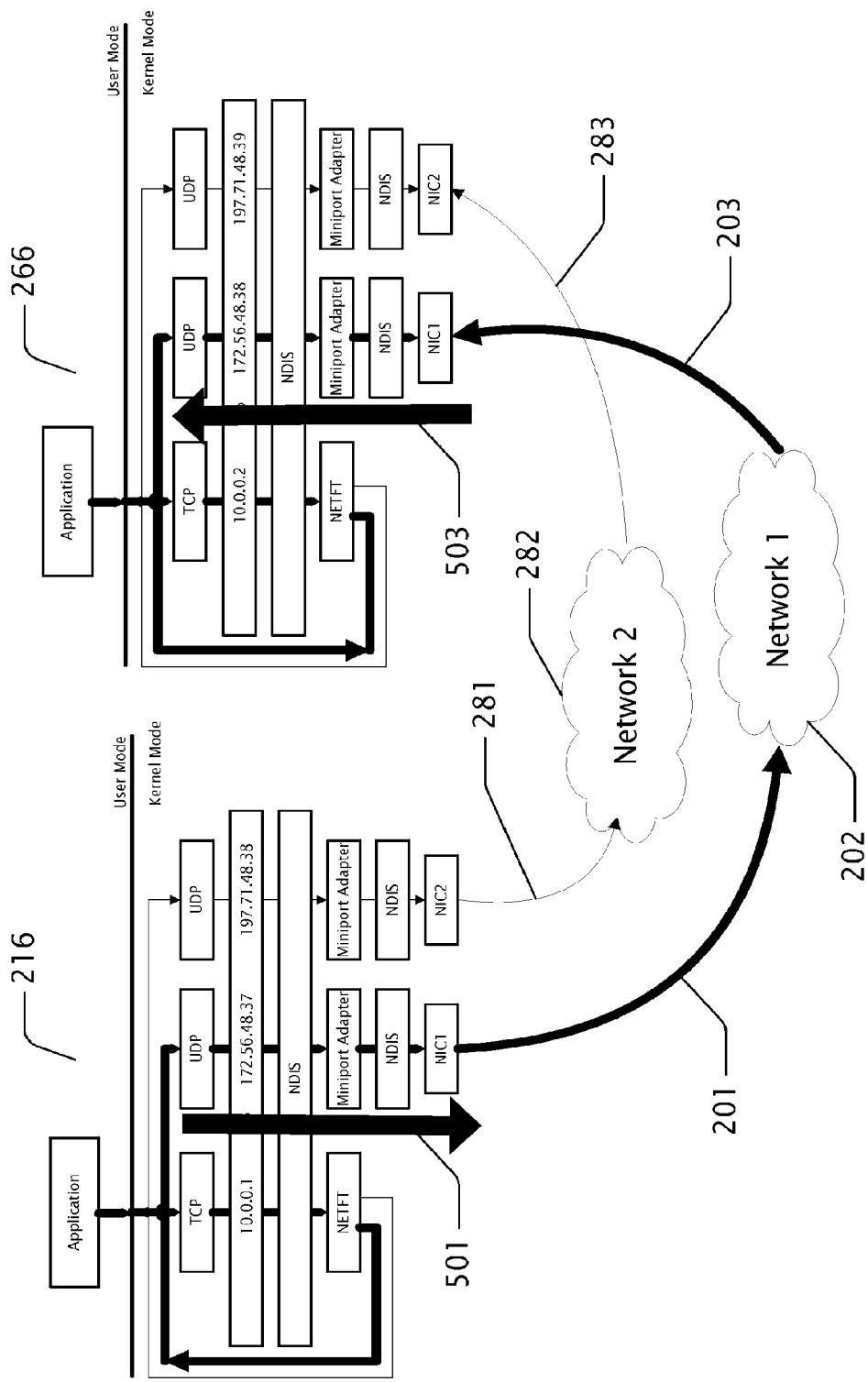
FIG. 5 is a flow diagram showing data flowing through a fault-tolerant communications environment including a source node and a destination node coupled via Path A over network 1 and Path B over network 2.

FIG. 5 is a flow diagram showing data flowing through a fault-tolerant communications environment 500 including a source node 216 and a destination node 266 coupled via Path A over network 1 202 and Path B over network 2 282. In this example environment 500, data is shown being sent from the application operating on node 216 to the application listening on the destination virtual address on node 266. The data packets flow down the network stack operating on node 216 using the TCP protocol into NETFT as shown by path 501. Assuming, as shown, that Path A is the selected pathway, NETFT maps the data packets from the source virtual address being used by the application to Path A and tunnels the data through the UDP protocol using the Path A physical destination address for target node 266, out NIC 1 of node 216 as further shown by path 501 and onto network 1 202 via link 201. The data then flows through network 1 202, over link 203 and to node 266, flowing up the network stack operating on node 266 as shown by path 503. The data then flows through the UDP protocol driver, the same protocol that was used on the sending side as the tunneling protocol, where the UDP protocol headers are stripped off the data packets which are then passed into NETFT operating on node 266. NETFT then forwards the data packets up the stack to the application which is listening on the destination virtual address. Responses tend to flow in the reverse order.

Figure 6:
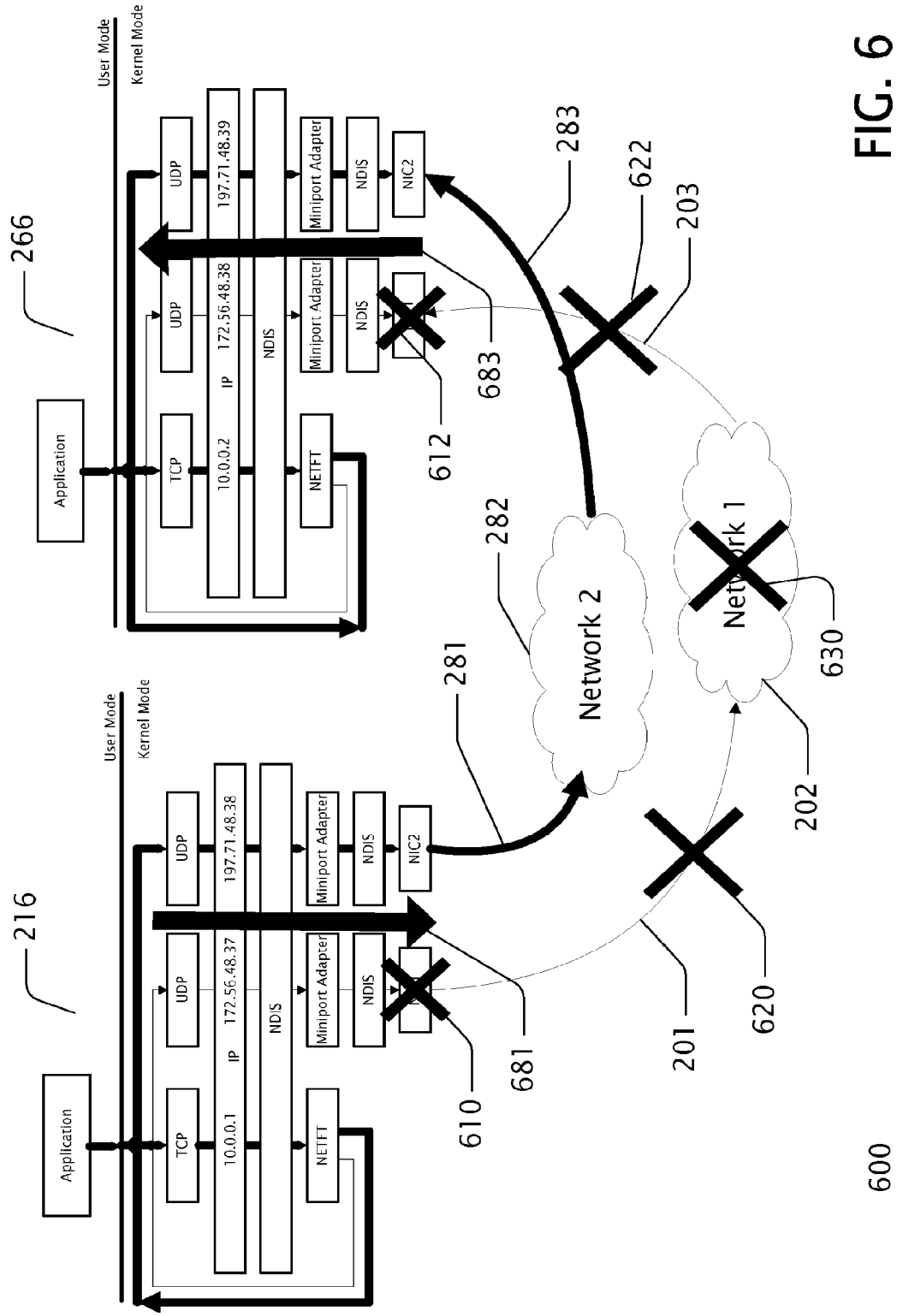
FIG. 6 is a flow diagram showing data flowing through the fault-tolerant communications environment shown in FIG. 5 with the addition of several possible communications failures.

FIG. 6 is a flow diagram showing data flowing through the fault-tolerant communications environment 500 shown in FIG. 5 with the addition of several possible communications failures 610, 612, 620, 622, and 630. Other communications failures are also possible. Failure 610 indicates a failure of NIC 1 operating on the sending node 216. Such a failure may occur should NIC 1 be removed from the node, should the driver of NIC 1 fail, should NIC 1 itself fail, or the like. The failure may be detected by NETFT via an event indication, such as a PnP event or the like, and/or a heartbeat failure. In such a situation Path A is typically considered to have failed and NETFT will select an alternate end-to-end-operational pathway. An end-to-end operational pathway is typically a pathway that can successfully deliver data from the source node and application all the way to the destination node and application.

Failure 620 indicates a failure of the network media coupling with NIC1 of node 216. This failure may be due to a cable being disconnected from NIC 1, from the cable becoming disconnected from some device of network 1 202, from the device the cable is connected to on the network side being powered down or failing, or the like. This type of failure may also be detected by NETFT via an event indication, such as a PnP event or the like, and/or a heartbeat failure and an alternate pathway selected.

Failure 630 indicates a failure of some type within network 202 resulting in data packets failing to reach destination node 266. In this failure case, sending node 216 may still be coupled to network 202 with a proper media sense indication, yet Path A has become disrupted further down the network. Given such a failure, NETFT operating on sending node 216 may not detect the failure via an event indication if local indications show connectivity to the network 202 as good, but may detect the failure via Path A heartbeat failure.

Failure 622 of link 203 and failure 612 of NIC 1 operating on receiving node 266 tend to be similar to the corresponding failures shown for node 216. But these failures, not being local to node 216 may not be detected via event indications but may be detected via heartbeat failure.

Any of these failures, and other failures, may be detected by NETFT operating on node 216 and result in it selecting an alternate end-to-end operational pathway, such as Path B over network 2 282. In this example, as shown in FIG. 6, NETFT tunnels data down alternate path 681 and over network 2 282 to receiving node 266. Should the failure condition be corrected and end-to-end operational status restored on Path A, NETFT operating on sending node 216 may detect the recovery and again make use of Path A. Further, any responses from node 266 back to node 216 may be tunneled in a similar fault-tolerant fashion by NETFT.

Figure 7:
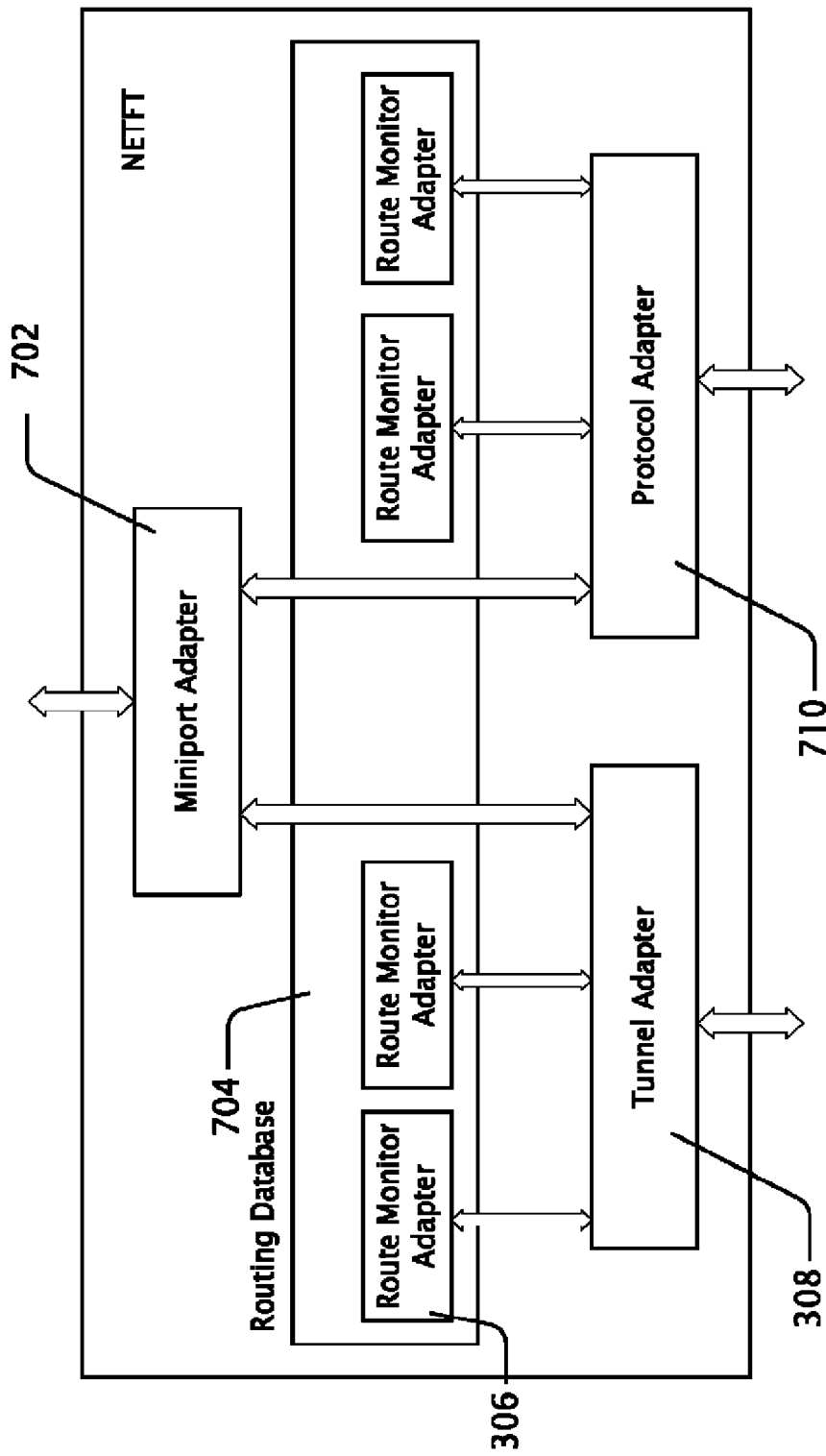
FIG. 7 is a block diagram showing and another example of a fault-tolerant communications driver, NETFT.

FIG. 7 is a block diagram showing and another example of a fault-tolerant communications driver, NETFT 700. This example is similar to the example shown in FIG. 3 but includes variations as described below. In this example, a software application may not need to use virtual addresses. Instead, an application may use a physical destination address to address data packets to the target node.

Protocol adapter 710 generally couples to miniport adapter 702 (also known as the processing element of the driver) and to a NIC miniport adapter (not shown). There is typically one protocol adapter for each NIC installed on the node, each protocol adapter being associated with a NIC via its NIC adapter. As each protocol adapter is associated with a NIC, it is also associated with the pathway coupled to the NIC. The protocol adapter 710 is operable to accept data packets from an application via the processing element 702 and pass the data packets to the associated NIC without the need for tunneling.

Processing element 702 typically parses a data packet flowing down the network stack, examines the physical destination address of the packet and uses information from the routing database 704 to determine if the packet can be forwarded over a protocol adapter 710 or needs to be tunneled over a tunnel adapter 308 to the target node. Generally, if the pathway indicated by the physical destination address is end-to-end operational, the data packet will be sent over that pathway. Otherwise and alternate pathway may be selected over which the packet may be tunneled.

In this example the routing database 704 maintains mappings of physical destination addresses and pathways, along with priority and other information as described above. An example routing database 704 mapping table is shown in Table 2.

TABLE 2

| Destination Address Type | Address | Priority |
| --- | --- | --- |
| Physical: Path A | 172.56.48.38 | 1 |
| Physical: Path B | 197.71.48.39 | 2 |

Referring to Table 2 and FIG. 2, Table 2 shows an example mapping table as might be used by NETFT operating on node 216. Table 2 shows a mapping including physical destination address 172.56.48.38 associated with Path A to node 266 and the physical destination address 197.71.48.39 associated with Path B to node 266. Path A is shown with first priority and Path B with second priority.

When sending data from node 216 to node 266, such a mapping table is typically used in forwarding (or tunneling if needed) a data packet being sent to physical destination address 172.56.48.38 of node 266. If the pathway associated with the original destination address is operational, the data packet tends to be forwarded to the destination node without tunneling. If that pathway in not available, then the data packet is sent over the alternate pathway to physical destination address 197.71.48.39 of node 266 via tunneling. Other aspects of NETFT 700 are generally similar to those of NETFT as described for FIG. 3.

Figure 8:
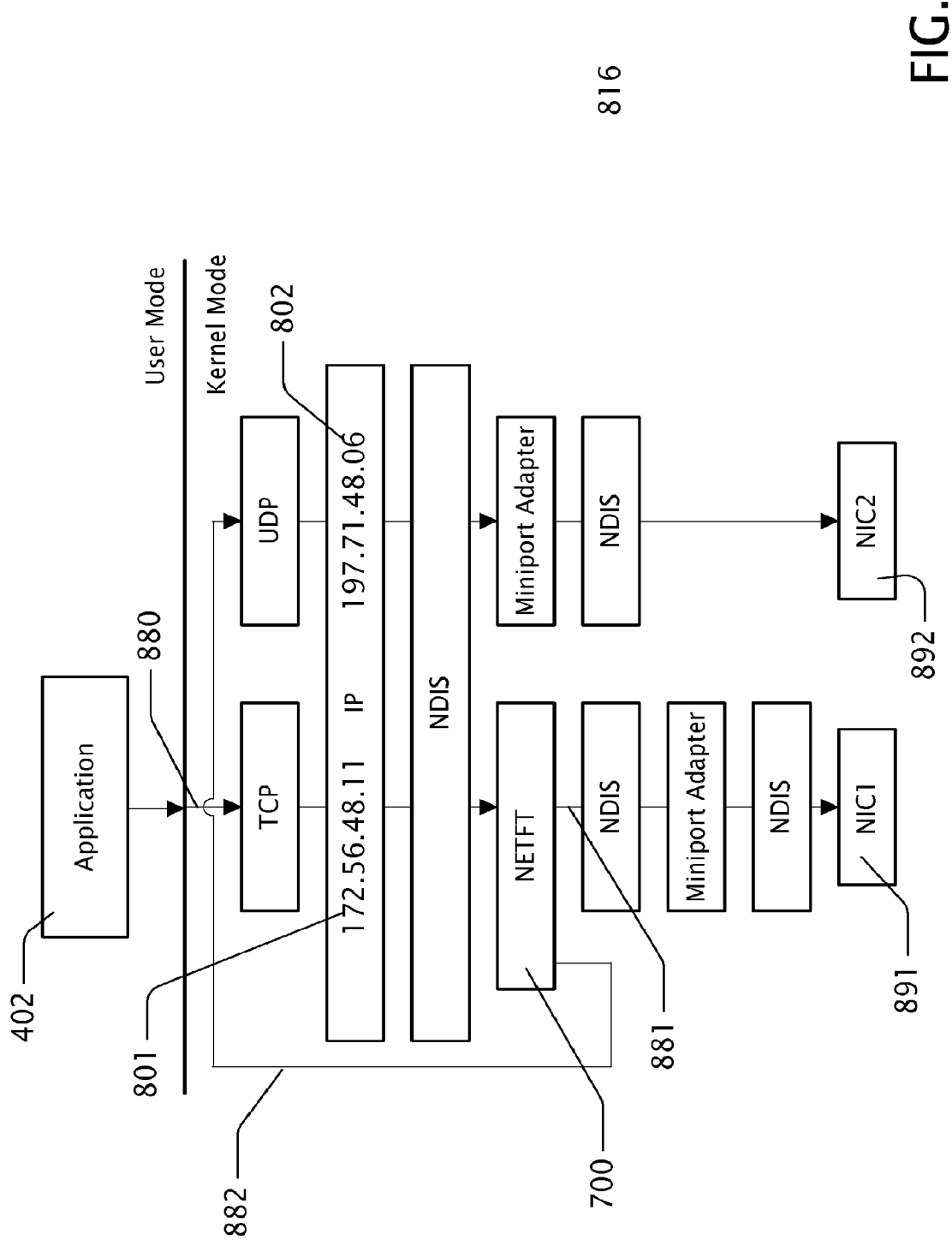
FIG. 8 is a block diagram showing an example fault-tolerant communications architecture including NETFT and an application.

FIG. 8 is a block diagram showing an example fault-tolerant communications architecture 216 including NETFT 700 and an application 402. In this example, application 402 sends data packets to NETFT 700 via the stack using a physical source address and a physical destination address 801 representing the destination node. Such out-going data packets flow via path 880 from the application and through the network stack to the driver 700. The driver 700 typically determines which of the possible pathways each packet should take, generally using priority information and pathway operational status information stored in the routing database, and either forwards the packet to the target node over pathway indicated by the original physical destination address or, if that pathway is not end-to-end operation, tunnels the packet over an alternate pathway as indicated in this example by route 882 and NIC 2 892.

Application 402 may send a data packet through NETFT 700 via the TCP protocol, as shown in FIG. 8. Alternatively UDP or any other protocol may be used. Also, as shown, NETFT 700 may use the UDP protocol to tunnel packets to the target node. Alternatively, TCP or any other protocol may be used for tunneling. Further, other examples may not make use of NDIS drivers but may use other mechanisms or architectures to perform similar functions. Finally, the various elements of the network stack and the like may operate in either a User Mode or a Kernel Mode, either as shown or otherwise, or on systems with or without equivalent modes of operation.

Figure 9:
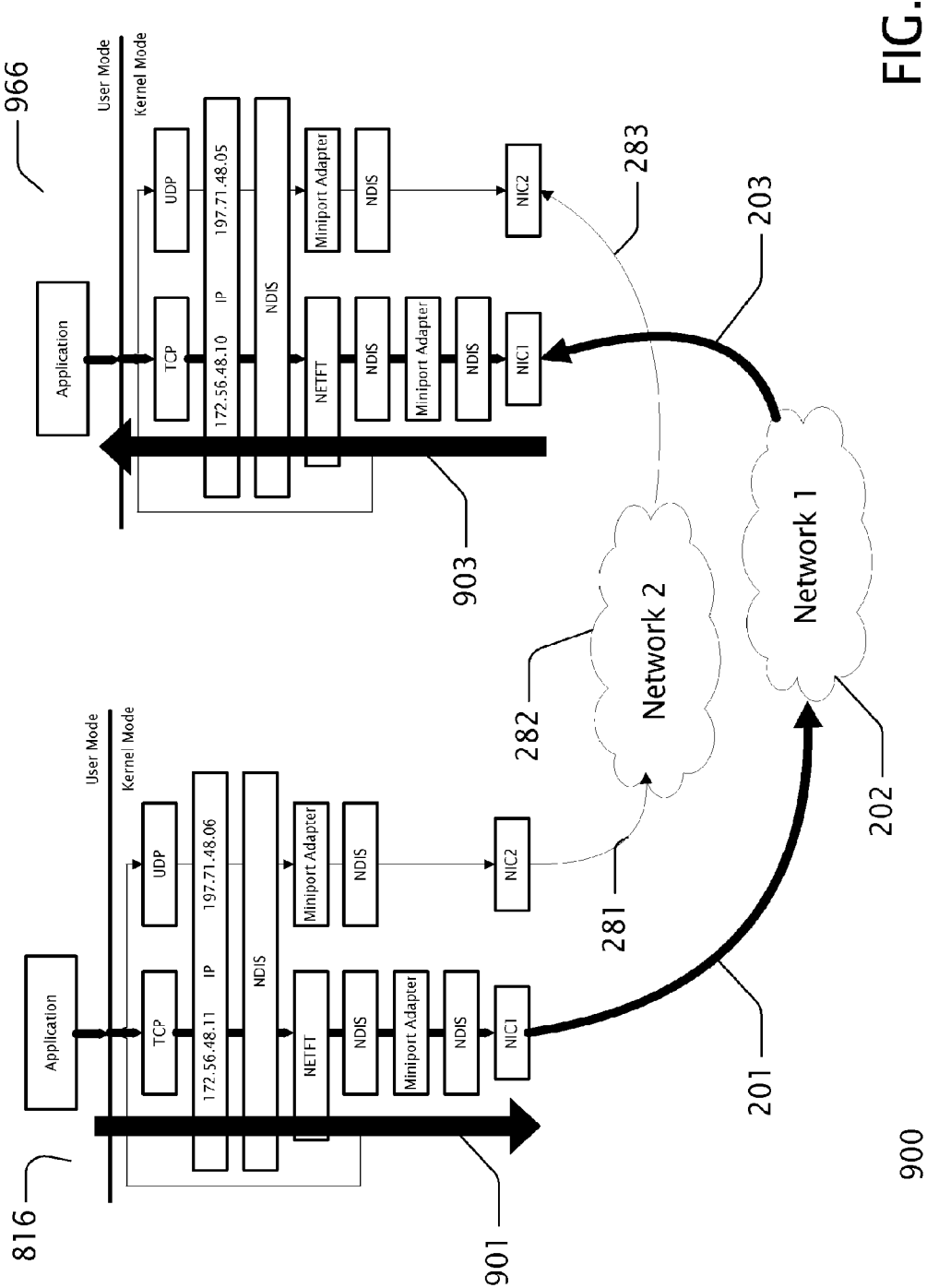
FIG. 9 is a flow diagram showing data flowing through a fault-tolerant communications environment including a source node and a destination node coupled via Path A over network 1 and Path B over network 2.

FIG. 9 is a flow diagram showing data flowing through a fault-tolerant communications environment 900 including a source node 816 and a destination node 966 coupled via Path A over network 1 202 and Path B over network 2 282. In this example environment 900, data is shown being sent from the application operating on node 216 to the application listening on the destination physical address on node 266. The data packets flow down the network stack operating on node 216 using the TCP protocol into NETFT as shown by path 901. Assuming, as shown, that Path A is the selected pathway, NETFT forwards the data packets using the physical destination address provided by the application via NIC 1 of node 216 over Path A and network 1 202 via link 201. The data then flows through network 1 202, over link 203 and to node 966, flowing up the network stack operating on node 966 as shown by path 903. The data then flows through NETFT and the protocol driver (a protocol driver for the same protocol that was used on the sending side as the sending protocol) and up to the application. Responses tend to flow in the reverse order.

Figure 10:
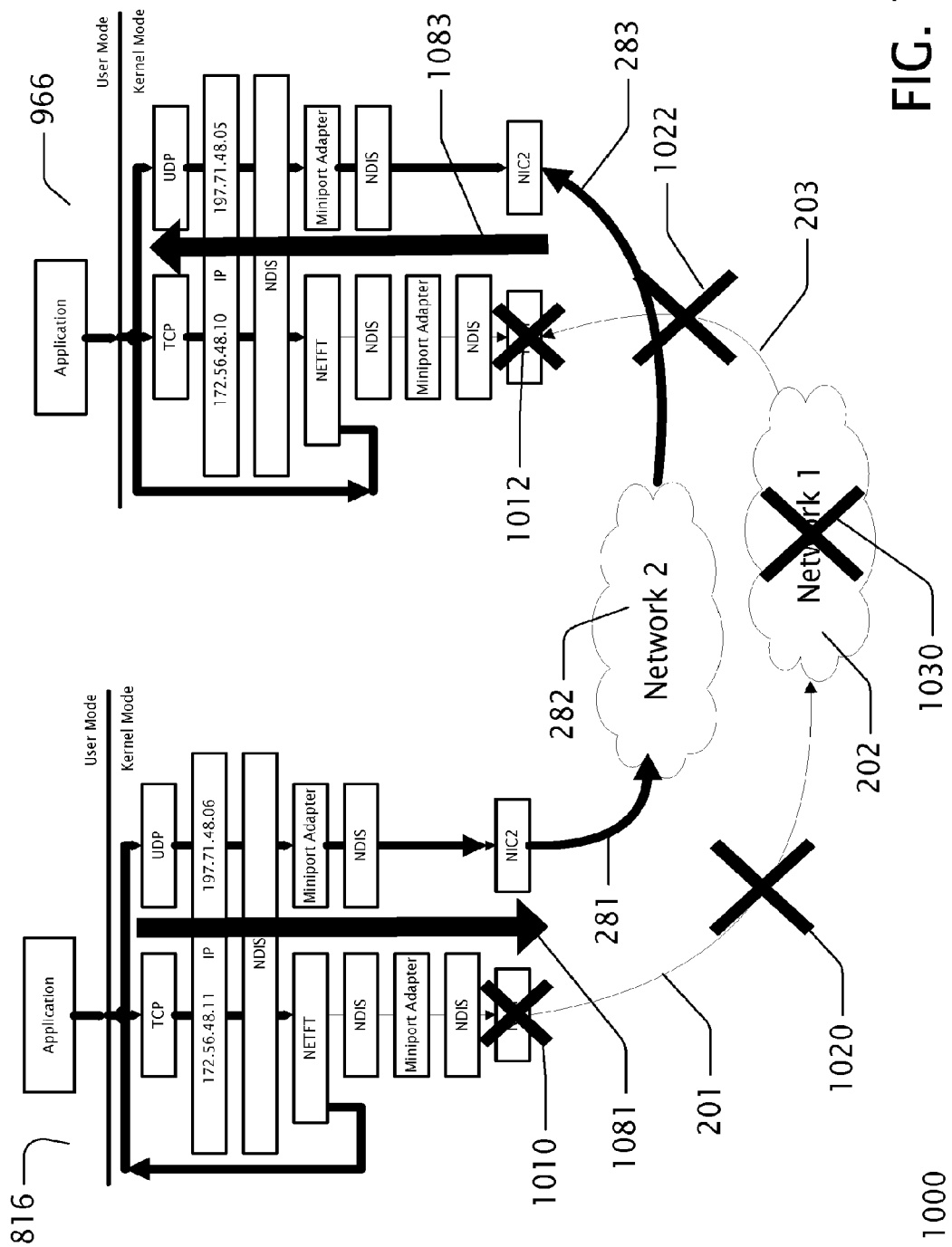
FIG. 10 is a flow diagram showing data flowing through the fault-tolerant communications environment shown in FIG. 9 with the addition of several possible communications failures.

FIG. 10 is a flow diagram showing data flowing through the fault-tolerant communications environment 900 shown in FIG. 9 with the addition of several possible communications failures 1010, 1012, 1020, 1022, and 1030. Other communications failures are also possible. Failure 1010 indicates a failure of NIC 1 operating on the sending node 816. Such a failure may occur should NIC 1 be removed from the node, its NIC driver fail, the NIC itself fail, or the like. The failure may be detected by NETFT via an event indication, such as a PnP event or the like, and/or a heartbeat failure. In such a situation Path A is typically considered to have failed and NETFT will select an alternate end-to-end-operational pathway.

Failure 1020 indicates a failure of the network media coupling with NIC1 of node 816. This failure may be due to a cable being disconnected from NIC 1, from the cable becoming disconnected from some device of network 1 202, from the device the cable is connected to on the network side being powered down or failing, or the like. This type of failure may also be detected by NETFT via an event indication, such as a PnP event or the like, and/or a heartbeat failure and an alternate pathway selected.

Failure 1030 indicates a failure of some type within network 202 resulting in data packets failing to reach destination node 966. In this failure case, sending node 816 may still be coupled to network 202 with a proper media sense indication, yet Path A has become disrupted further down the network. Given such a failure, NETFT operating on sending node 816 may not detect the failure via an event indication, such as a PnP event or the like, if local indications show connectivity to the network 202 as good, but may detect the failure via Path A heartbeat failure.

Failure 1022 of link 203 and failure 1012 of NIC 1 operating on receiving node 966 tend to be similar to the corresponding failures shown for node 816. But these failures, not being local to node 816 may not be detected via event indications but may be detected via heartbeat failure.

Any of these failures, and other failures, may be detected by NETFT operating on node 816 and result in it selecting an alternate end-to-end operational pathway, such as Path B over network 2 282. In this example, as shown in FIG. 10, NETFT tunnels data down alternate path 1081 and over network 2 282 to receiving node 966. Should the failure condition be corrected and end-to-end operational status restored on Path A, NETFT operating on sending node 816 may detect the recovery and again make use of Path A. Further, any responses from node 966 back to node 816 may be forwarded or tunneled, depending on the operational status of Path A and Path B, in a similar fault-tolerant fashion by its NETFT.

Figure 11:
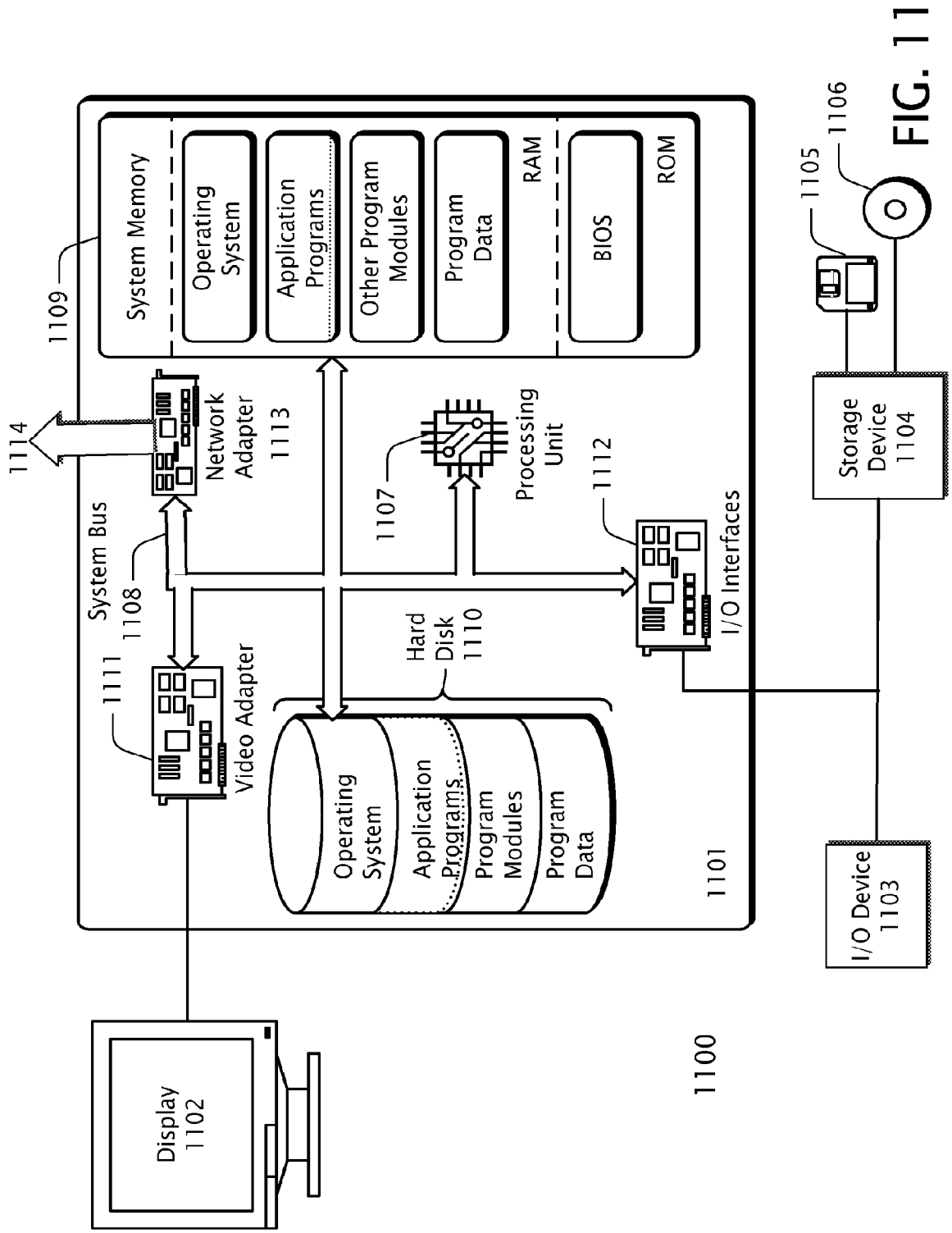
FIG. 11 is a block diagram showing an example computing environment in which the technology described above may be implemented.

FIG. 11 is a block diagram showing an example computing environment 1100 in which the technology described above may be implemented. A suitable computing environment may be implemented with numerous general purpose or special purpose systems. Examples of well known systems may include, but are not limited to, personal computers ("PC"), hand-held or laptop devices, microprocessor-based systems, multiprocessor systems, servers, workstations, consumer electronic devices, set-top boxes, and the like.

Computing environment 1100 generally includes a general-purpose computing system in the form of a computing device 1101 coupled to various peripheral devices 1102, 1103, 1104 and the like. System 1100 may couple to various input devices 1103, including keyboards and pointing devices, such as a mouse or trackball, via one or more I/O interfaces 1112. The components of computing device 1101 may include one or more processors (including central processing units ("CPU"), graphics processing units ("GPU"), microprocessors ("uP"), and the like) 1107, system memory 1109, and a system bus 1108 that typically couples the various components. Processor 1107 typically processes or executes various computer-executable instructions to control the operation of computing device 1101 and to communicate with other electronic and/or computing devices, systems or environment (not shown) via various communications connections such as a network connection 1114 or the like. System bus 1108 represents any number of several types of bus structures, including a memory bus or memory controller, a peripheral bus, a serial bus, an accelerated graphics port, a processor or local bus using any of a variety of bus architectures, and the like.

System memory 1109 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 1109 typically stores data, computer-executable instructions and/or program modules comprising computer-executable instructions that are immediately accessible to and/or presently operated on by one or more of the processors 1107.

Mass storage devices 1104 and 1110 may be coupled to computing device 1101 or incorporated into computing device 1101 via coupling to the system bus. Such mass storage devices 1104 and 1110 may include a magnetic disk drive which reads from and/or writes to a removable, non-volatile magnetic disk (e.g., a "floppy disk") 1105, and/or an optical disk drive that reads from and/or writes to a non-volatile optical disk such as a CD ROM, DVD ROM 1106. Alternatively, a mass storage device, such as hard disk 1110, may include non-removable storage medium. Other mass storage devices may include memory cards, memory sticks, tape storage devices, and the like.

Any number of computer programs, files, data structures, and the like may be stored on the hard disk 1110, other storage devices 1104, 1105, 1106 and system memory 1109 (typically limited by available space) including, by way of example, operating systems, application programs, data files, directory structures, and computer-executable instructions.

Output devices, such as display device 1102, may be coupled to computing device 1101 via an interface, such as video adapter 1111. Other types of output devices may include printers, audio outputs, tactile devices or other sensory output mechanisms, or the like. Output devices may enable computing device 1101 to interact with human operators or other machines or systems. A user may interface with computing environment 1100 via any number of different input devices 1103 such as a keyboard, mouse, joystick, game pad, data port, and the like. These and other input devices may be coupled to processor 1107 via input/output interfaces 1112 which may be coupled to system bus 1108, and may be coupled by other interfaces and bus structures, such as a parallel port, game port, universal serial bus ("USB"), fire wire, infrared port, and the like.

Computing device 1101 may operate in a networked environment via communications connections to one or more remote computing devices through one or more local area networks ("LAN"), wide area networks ("WAN"), storage area networks ("SAN"), the Internet, radio links, optical links and the like. Computing device 1101 may be coupled to a network via network adapter 1113 or the like, or, alternatively, via a modem, digital subscriber line ("DSL") link, integrated services digital network ("ISDN") link, Internet link, wireless link, or the like.

Communications connection 1114, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code or data maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, communications media, and the like.

The invention claimed is:

1. A method for providing fault tolerant communications, by a fault tolerant driver, between a first device and a second device, wherein the first device comprises the fault tolerant driver, a first protocol driver paired with a first network adapter, a second protocol driver paired with a second network adapter, and an application paired with a third protocol driver, the method comprising:

receiving, by the fault tolerant driver, data from the application via the third protocol driver, the fault tolerant driver coupled to the first protocol driver and to the second protocol driver, the first device coupled to the second device through a first pathway over a first network via the first network adapter, and the first device further coupled to the second device through a second pathway over a second network via the second network adapter;

detecting, by the fault tolerant driver, a failure of the first pathway;

if, based on the detecting, the first pathway has not failed, then routing, by the fault tolerant driver, the data received via the third protocol driver via the first protocol driver and through the first pathway to the second device, wherein the first protocol driver is separate from the third protocol driver; and if, based on the detecting, the first pathway has failed, then routing, by the fault tolerant driver, the data received via the third protocol driver via the second protocol driver and through the second pathway to the second device, wherein the second protocol driver is separate from the third protocol driver.

2. The method of claim 1 wherein the first, second, and third protocol drivers each employ a routable transport protocol.

3. The method of claim 2 wherein the routable transport protocol is based on Internet Protocol ("IP").

4. The method of claim 1 wherein the first network and the second network are independent of each other.

5. The method of claim 1 wherein the checking is based on a heartbeat failure.

6. The method of claim 1 wherein at least the first, second, or third protocol driver employs a non-routable transport protocol.

7. The method of claim 1 wherein the fault tolerant driver operates in a kernel mode of the first device.

8. At least one device storing instructions that, when executed by a computing device, cause the computing device to perform a method for providing fault tolerant communications, by a fault tolerant driver, between a first device and a second device, wherein the first device comprises the fault tolerant driver, a first protocol driver paired with a first network adapter, a second protocol driver paired with a second network adapter, and an application paired with a third protocol driver, the method comprising: the first device coupled to the second device through a first pathway over a first network via the first network adapter, and the first device further coupled to the second device through a second pathway over a second network via the second network adapter; detecting, by the fault tolerant driver, a failure of the first pathway; if, based on the detecting, the first pathway has not failed, then routing, by the fault tolerant driver, the data received via the third protocol driver via the first protocol driver and through the first pathway to the second device, wherein the first protocol driver is separate from the third protocol driver; and if, based on the detecting, the first pathway has failed, then routing, by the fault tolerant driver, the data received via the third protocol driver via the second protocol driver and through the second pathway to the second device, wherein the second protocol driver is separate from the third protocol driver.

9. The at least one device of claim 8 wherein the first, second, and third protocol drivers each employ a routable transport protocol.

10. The at least one device of claim 9 wherein the routable transport protocol is based on Internet Protocol ("IP").

11. The at least one device of claim 8 wherein the first network and the second network are independent of each other.

12. The at least one device of claim 8 wherein the checking is based on a heartbeat failure.

13. The at least one device of claim 8 wherein at least the first, second, or third protocol driver employs a non-routable transport protocol.

14. The at least one device of claim 8 wherein the fault tolerant driver operates in a kernel mode of the first device.

15. A system comprising:
a first device including a memory, wherein the first device comprises the fault tolerant driver, a first protocol driver paired with a first network adapter, a second protocol driver paired with a second network adapter, and an application paired with a third protocol driver;
the first device coupled to the second device through a first pathway over a first network via the first network adapter, and the first device further coupled to the second device through a second pathway over a second network via the second network adapter;
the fault tolerant driver further configured for detecting a failure of the first pathway;
the fault tolerant driver further configured for routing, if the first pathway has not failed as determined based on the detecting, the data received via the third protocol driver via the first protocol driver and through the first pathway to the second device, wherein the first protocol driver is separate from the third protocol driver; and
the fault tolerant driver further configured for routing, if the first pathway has failed as determined based on the detecting, the data received via the third protocol driver via the second protocol driver and through the second pathway to the second device, wherein the second protocol driver is separate from the third protocol driver.

16. The system of claim 15 wherein the first, second, and third protocol drivers are each configured to employ a routable transport protocol.

17. The system of claim 16 wherein the routable transport protocol is based on Internet Protocol ("IP").

18. The system of claim 15 wherein the first network and the second network are independent of each other.

19. The system of claim 15 wherein the checking is based on a heartbeat failure.

20. The system of claim 15 wherein the fault tolerant driver is configured to operate in a kernel mode of the first device.

* * * * *